Figure 1:
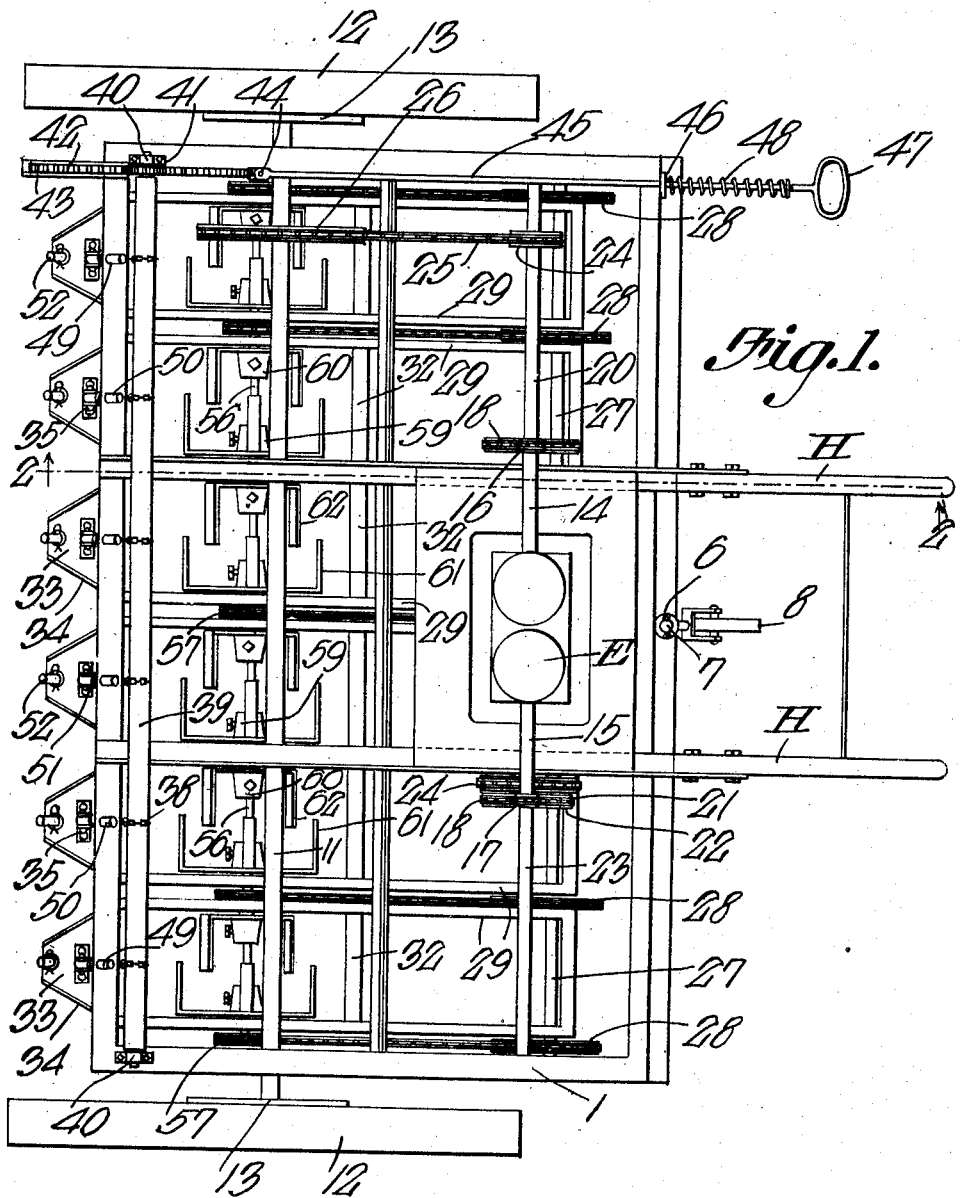

A. CLARK.
BEET BLOCKING CULTIVATOR.
APPLICATION FILED DEC. 7, 1911.

1,025,961.

Patented May 14, 1912.
3 SHEETS—SHEET 1.

Witnesses

Arnold Clark Inventor
by
Attorneys

A. CLARK.
BEET BLOCKING CULTIVATOR.
APPLICATION FILED DEC. 7, 1911.
1,025,961.
Patented May 14, 1912.
3 SHEETS—SHEET 2.
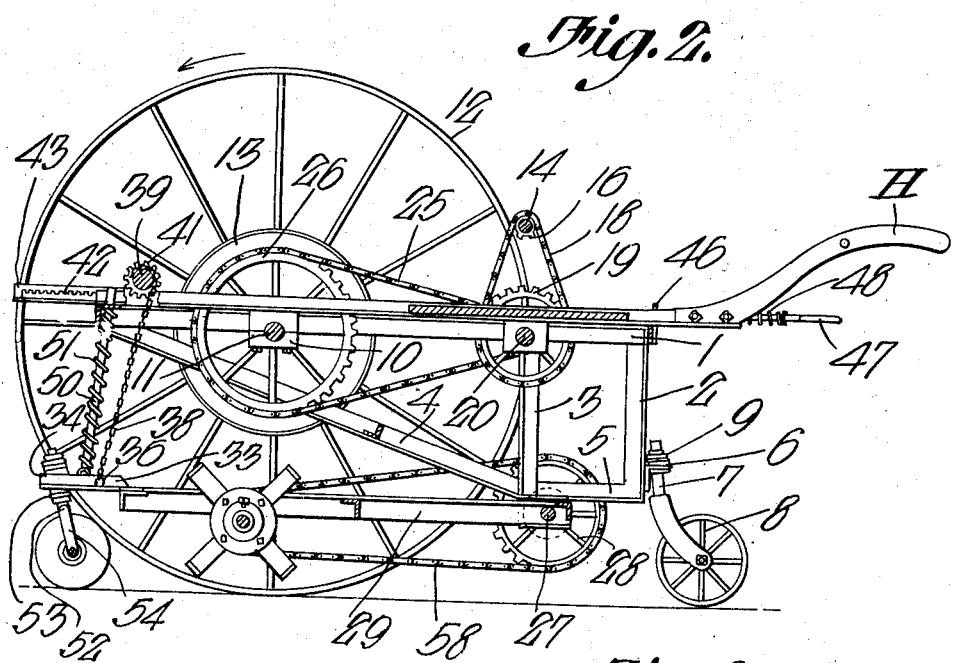
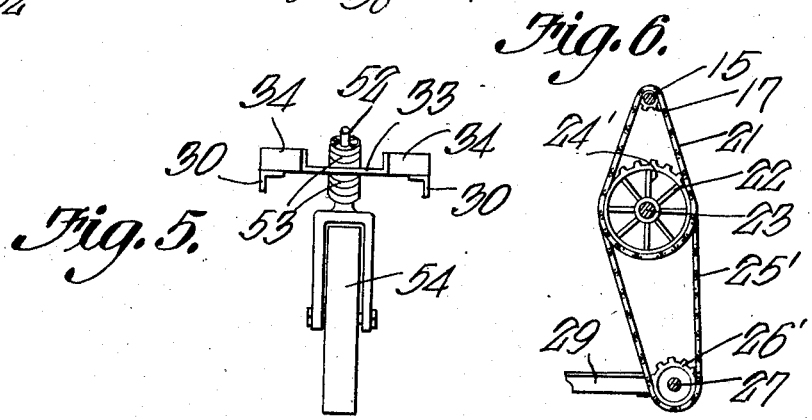
Witnesses
Arnold Clark
Inventor
by
Attorneys

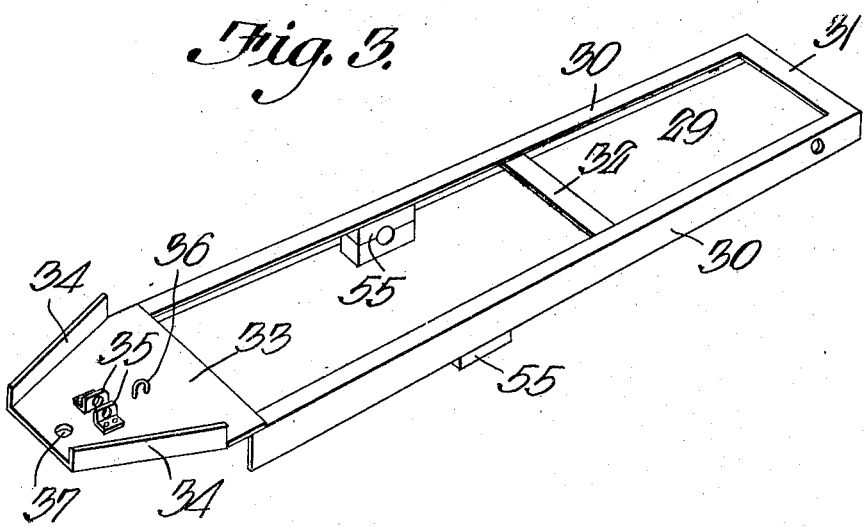
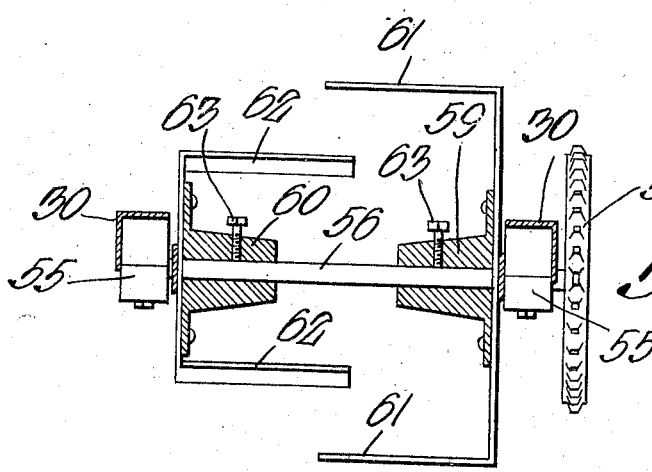

UNITED STATES PATENT OFFICE.

ARNOLD CLARK, OF LATTY, OHIO.

BEET-BLOCKING CULTIVATOR.

1,025,961.     Specification of Letters Patent.     Patented May 14, 1912.

Application filed December 7, 1911. Serial No. 664,417.

*To all whom it may concern:*

Be it known that I, ARNOLD CLARK, a citizen of the United States, residing at Latty, in the county of Paulding and State of Ohio, have invented a new and useful Beet-Blocking Cultivator, of which the following is a specification.

The present invention relates to improvements in beet blocking cultivators, the primary object of the invention being the provision of a motor driven cultivator adapted to be operated at right angles to the row of growing beets before the thinning operation thereof, the same being provided with parallel disposed and operative means for blocking out the stand, whereby the desired number of plants are left standing to be finally thinned manually.

A further object of the present invention is the provision of a plurality of parallel disposed spring cushioned and swinging frames, each of which is provided with coacting rotary cutters for cutting the standing plants and loosening the earth so that the plants will be prevented from again taking root, said cutting means being so disposed as to leave standing at the proper desired distances apart the desired plants, which are finally thinned manually, said cutters being adjustable so as to regulate the distance between the standing plants as may be desired.

A still further object of the present invention is the provision of a motor driven beet blocking and cultivating mechanism, which is adapted to be operated at right angles to the rows so as to cut a plurality of parallel swaths thereacross and to leave standing at predetermined distances certain plants in each row, thus reducing the manual labor of thinning and at the same time agitating and breaking the ground between the selected plants.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of the complete cultivator. Fig. 2 is a section taken on line 2—2 of Fig. 1. Fig. 3 is a perspective view of one of the swinging frames in which is journaled the shaft carrying the rotary blockers and cutters. Fig. 4 is a cross section through said frame showing the position of the cutters with relation to each other thereupon. Fig. 5 is a detail view of one of the casters carried by the forward free end of each of said frames. Fig. 6 is a detail view showing the transmission between the engine, intermediate and operating shafts of the cutters.

Referring to the drawings, the numeral 1 designates a rectangular framework composed of angle irons and provided at its rear portion with the downwardly projected parallel arms 2 and 3 and with the forwardly projecting inclined plates 4, the lower ends of the arms 2 and 3 being connected by the angle plates 5 which provides a support for the various shafts of the machine and also for the explosive motor E.

Connected to the central rear portion of the plate 2 is an eyed lug 6 in which is journaled the stem 7 of the rear caster wheel 8, the washers 9 being provided to permit of the proper adjustment of said stem 7 so that the caster wheel may be positioned to permit the rear portion of the frame to be elevated or lowered as may be desired.

Connected to the sides of the main frame 1 are the boxes 10 for the reception of the main axle or shaft 11, which has connected at the respective ends thereof the traction wheels 12, the same being connected to said shaft through the medium of the pawl and ratchet clutches 13 which are of any desired structure, but which will permit the rotation of the wheels 12 in a rearward direction without affecting the shaft, but which are disposed to be operated by the shaft when rotated in the direction of the arrow, as shown in Fig. 2.

Operably connected to the explosive engine 14 and extended in opposite directions therefrom are the two shafts 14 and 15 carrying the small sprockets 16 and 17 respectively. Connected to the sprocket 16 is a chain 18 which transmits motion from the shaft 14 through the large sprocket 19 to the short shaft 20. Said shaft 20 is provided with a small sprocket 24 which through the medium of the sprocket chain 25 and the enlarged sprocket 26 conveys motion to the traction axle 11.

The sprocket 17 carried by the shaft 15 is connected through a sprocket chain 21 to the sprocket 22 keyed upon the shaft 23 which corresponds to the shaft 20 but is disposed in opposite direction thereto, said shaft 23 having keyed thereon a sprocket 24'. Trained upon this sprocket 24' is a sprocket chain 25' which transmits motion through the small sprocket 26' to the cutters' driving shaft 27 which is journaled in the rear and lower portion of the main frame of the machine. Keyed upon this shaft 27 and rotatable therewith at predetermined distances throughout the length thereof are the large sprockets 28, the purpose of which will presently appear.

Pivotally connected upon the respective shafts 27 are the forwardly projecting frames 29, each one of which, as clearly shown in Fig. 3, consists of the long plates 30 composed of angle irons with the transverse connecting plates 31 and 32 and the forward castings 33. Carried by this casting 33 are the upstanding flanges 34, the two pivoting lugs 35, the bail 36, the said plate or casting being further provided with an aperture 37, the purpose of which will presently appear. In order to elevate and regulate the positioning of the forward free end of the respective frames 29, a chain or other flexible connection 38 is connected to the respective bails 36 of said frames at its lower end while the upper end thereof is connected to the shaft 39 journaled in the boxing 40 carried by the main frame 1 of the machine, the said shaft being provided with the pinion 41 which is in mesh at all times with the sliding rack 42. This sliding rack 42 is mounted for sliding movement in the guide 43 carried by the frame 1 while at 44 it is connected to the forward end of the operating rod 45, said operating rod 45 being mounted for slidable movement in the bracket 46 carried by the main frame and further provided with the operating handle 47 so that the operator in guiding the machine through the medium of the handles H, may readily grip the handle 47 to move the rack 42 and thereby rotate the shaft 39 and simultaneously elevate or lower the respective frames 29, the purpose of which will presently appear. To normally hold the rod 45 in outward position, or more properly speaking in neutral position, a spring 48 is disposed thereupon, the same holding the rack 42 in the position as clearly shown in Fig. 1.

In order to provide a spring cushioned movement to the outer free ends of the respective frames 29 and at the same time hold them in relative alinement, the apertures 49 are provided in the forward portion of the main frame 1 which have slidably fitted therein the upper ends of the respective guide rods 50, a spring 51 being disposed upon the guide rod between its connection to the pivoting lugs 35 and the under side of the frame 1 so as to normally exert a tension downwardly to hold the lower free end of its respective frame 29 toward the ground. In order to limit the downward movement of the frame and thereby regulate the cutting action of the cutting and blocking mechanism with relation to the standing plants, a pin 52 is passed through the aperture 37 of the respective frames 29, the washers 53 being disposed thereupon so as to abut the plate upon the upper or lower side, or both, as desired to regulate the adjustment of the caster 54 which is adapted to rest upon the ground and retain the free end of the frame 29 in the desired relative position.

Carried by the plates 30 of each of the frames 29 intermediate of the ends thereof, are the alined boxings or journals 55 in which is rotatably mounted a short shaft 56. Upon one end of the shaft 56, is keyed a sprocket 57 which is connected through its sprocket chain 58 to its respective sprocket wheel 28 of the shaft 27. Thus the rotation of the shaft 27 will simultaneously rotate all of the sprocket chains 58 and sprocket wheels 57 so that the shafts 56 carried by the respective frames 29 will be rotated simultaneously. Mounted upon the respective shafts 56 are two bushings 59 and 60 respectively, each one of which is provided with the respective spaced cutting arms 61 and 62 respectively, which are disposed at proper angles with relation to each other so as to coact in engaging the earth to cut a portion of the standing plants between the plates 30 of the frames 29 and leave standing the plants disposed between the respective frames 29 below the respective sprockets 57 and the adjacent portions of the next frame. In order to adjust the bushings 59 and their cutting blades 61 and 62 respectively upon the shaft 56 so that the swath cut will vary according to the desire of the operator, the set screws 63 are provided.

Any well known means may be interposed between the engine and the shafts 14 and 15 so that the engine may run freely without affecting the machine, such control being placed in ready access to the operator at the guiding handles H, the respective caster wheels 8 and 54 in conjunction with the traction wheels 12 supporting the main frame of the machine in the desired position so that the operator simply has to guide the machine with the handles H following in the path of the same during the operation.

From the foregoing description taken in connection with the drawings, it is evident that when this machine is operated at right angles to the rows of growing plants, the respective pairs of cutters 61 and 62 will operate to cut parallel strips of plants throughout the width of the field and by reason of the fact that the frames are spaced apart and operate independently, the plants between the respective frames will be left standing, thus reducing the thinning operation to a minimum and at the same time to a great extent, hoeing the earth between the stand so as to produce the desired cultivating effect thereupon.

What is claimed is:

1. A motor driven blocking cultivator, having a frame, a motor on said frame, traction wheels operably connected to the motor, a plurality of pivoted frames disposed in spaced relation throughout the width of the main frame, the free ends thereof being projected toward the forward portion of the main frame, a caster wheel carried in the free end of each pivoted frame for regulating the positioning of the same with relation to the ground, means for simultaneously elevating the free ends of all of said pivoted frames, a pair of rotary cutters disposed in each of said pivoted frames, and means for operably connecting all of said cutters to the motor for operation in unison.

2. A motor driven blocking cultivator, having a frame, a motor on said frame, traction wheels operably connected to the motor, a plurality of pivoted frames disposed in spaced relation throughout the width of the main frame, the free ends thereof being projected toward the forward portion of the main frame, a caster wheel carried in the free ends of each pivoted frame for regulating the position of the same with relation to the ground, means for simultaneously elevating the free ends of all of said pivoted frames, a pair of rotary cutters disposed in each of said pivoted frames, means for operably connecting all of said cutters of the pivoted frames for operation in unison through the motor, and a spring cushioned means interposed between the free end of each frame and the main frame for holding the free ends of the pivoted frame yieldably toward the ground.

3. A motor driven blocking cultivator, having a frame, a motor on said frame, traction wheels operably connected to the motor, a plurality of pivoted frames disposed in spaced relation throughout the width of the main frame, the free ends thereof being projected toward the forward portion of the main frame, a caster wheel carried in the free end of each pivoted frame for regulating the position of the same with relation to the ground, means for simultaneously elevating the free ends of all of said pivoted frames, a shaft journaled in each pivoted frame intermediate of its ends, means for operably connecting all of said shafts for rotation in unison through the motor, and a pair of adjustably mounted cutting arms connected to each shaft within its respective pivoted frame.

4. A cultivator of this character, having a main frame, a motor carried thereby, a pair of traction wheels mounted in the main frame and operably connected to said motor, a plurality of swinging frames having the rear ends thereof pivoted to the main frame, a caster adjustably mounted upon the forward free end of each pivoted frame for regulating the relative position thereof to the ground, manually operated means for elevating the free ends of said pivoted frames in unison, and a rotary cutting and cultivating means disposed in each of said pivoted frames and operably connected to the motor for operation in unison, said cutting means being disposed within the pivoted frames and adjustable relative to each other.

5. A cultivator of this character, having a main frame, a motor mounted therein, traction wheels operably connected to said motor, a pair of handles for guiding the cultivator connected to the main frame, a plurality of pivoted frames disposed in spaced relation throughout the width of the main frame, the free ends of said frames being toward the forward portion of the main frame, a caster adjustably connected to the free end of each of said pivoted frames for regulating the position thereof to the ground, a shaft journaled in the forward portion of the main frame, a plurality of flexible connections connected to said shaft and to the free ends of the pivoted frames, manually operated means for rotating said shaft to elevate and lower the free ends of the pivoted frames in unison, and a pair of rotary cutters and cultivators journaled in each pivoted frame and operably connected to the motor.

6. A cultivator of this character, having a main frame, a motor mounted therein, traction wheels operably connected to said motor, a pair of handles for guiding the cultivator connected to the main frame, a plurality of pivoted frames disposed in spaced relation throughout the width of the main frame, the free ends of said frames being toward the forward portion of the main frame, a caster adjustably connected to the free end of each of said pivoted frames for regulating the position thereof to the ground, a shaft journaled in the forward portion of the main frame, a plurality of flexible connections connected to said shaft and to the free ends of the pivoted frames, manually operated means for rotating said shaft to elevate and lower the free ends of the pivoted frames in unison, a shaft journaled in each of said pivoted frames intermediate of its ends, means for operably connecting said shaft of the pivoted frames to the motor, and a pair of cutting and cultivating arms carried by each shaft of the pivoted frame.

7. A cultivator of this character, having a main frame, a motor mounted therein, traction wheels operably connected to said motor, a pair of handles for guiding the cultivator connected to the main frame, a plurality of pivoted frames disposed in spaced relation throughout the width of the main frame, the free ends of said frames being toward the forward portion of the main frame, a caster adjustably connected to the free end of each of said pivoted frames for regulating the position thereof to the ground, a shaft journaled in the forward portion of the main frame, a plurality of flexible connections connected to said shaft and to the free ends of the pivoted frames, manually operated means for rotating said shaft to elevate and lower the free ends of the pivoted frames in unison, a shaft journaled in each of said pivoted frames intermediate of its ends, means for operably connecting said shaft of the pivoted frames to the motor, and a pair of cutting and cultivating arms carried by each shaft of the pivoted frame, each of said arms being adjustably mounted upon its respective shaft to regulate the width of the swath cut.

In testimony that I claim the foregoing as my own, I have hereto affixed my signature in the presence of two witnesses.

ARNOLD X CLARK.
his
mark

Witnesses:
    CHARLES KEITH,
    BLANCHE HAVILAND.